United States Patent
Kolaci

[11] Patent Number: 5,841,077
[45] Date of Patent: Nov. 24, 1998

[54] DIGITAL LOAD CELL ASSEMBLY

[76] Inventor: Rudolph J. Kolaci, 3-09 Saddle River Rd., Fair Lawn, N.J. 07410

[21] Appl. No.: 565,665

[22] Filed: Dec. 1, 1995

[51] Int. Cl.[6] ............................... G01G 3/14; H01B 7/06
[52] U.S. Cl. ................................. 177/210 R; 174/68.1; 174/70 R; 333/245; 177/25.11; 177/211
[58] Field of Search ................. 174/70 R, 68.1, 174/25.11, 210 R, 211; 333/245

[56] References Cited

U.S. PATENT DOCUMENTS

| | | | |
|---|---|---|---|
| 3,838,744 | 10/1974 | Tanji et la. | 177/25.11 |
| 4,137,979 | 2/1979 | Itani | 177/25.11 |
| 4,344,494 | 8/1982 | Knothe et al. | 177/25.11 |
| 4,350,216 | 9/1982 | Mavretic | 177/25.11 |
| 4,363,370 | 12/1982 | Sarkison | 177/25.11 |
| 4,488,147 | 12/1984 | Signorile | 340/636 |
| 4,579,407 | 4/1986 | Shimada | 339/29 R |
| 4,611,674 | 9/1986 | Adachi et al. | 177/25.11 |
| 4,763,740 | 8/1988 | Pattern | 177/25.11 |
| 4,775,328 | 10/1988 | McCarthy | 439/211 |
| 4,799,559 | 1/1989 | Mürdter et al. | 177/25.11 |
| 4,815,547 | 3/1989 | Dillon et al. | 177/211 |
| 5,135,062 | 8/1992 | Lockery et al. | 177/211 |
| 5,382,932 | 1/1995 | Monti | 333/245 |
| 5,391,844 | 2/1995 | Johnson et al. | 177/25.11 |
| 5,508,946 | 4/1996 | Kawara et al. | 177/25.11 |
| 5,515,737 | 5/1996 | Imai et al. | 177/211 |
| 5,623,128 | 4/1997 | Grimm et al. | 177/211 |

*Primary Examiner*—Michael L. Gellner
*Assistant Examiner*—Randy W. Gibson
*Attorney, Agent, or Firm*—Lerner, David, Littenberg, Krumholz & Mentlik

[57] ABSTRACT

A digital load cell assembly is disclosed. The digital load cell assembly includes at least one load cell for detecting an applied force and producing analog signals proportional to the applied force. The analog signals are transmitted along a cable assembly which is electrically connected to the load cell. The cable assembly has analog to digital circuitry and a power supply mounted on a printed circuit board, and is adapted to transmit digital signals representative of the force applied to the associated load cell for displaying a value corresponding to the applied force on an associated display indicator.

17 Claims, 7 Drawing Sheets

| FIG. 3A | FIG. 3B | FIG. 3C |

DIGITAL LOAD CELL ASSEMBLY

FIELD OF THE INVENTION

The present invention pertains to digital load cells. More particularly, the present invention relates to digital load cell assemblies which include at least one load cell element for detecting a force exerted thereon, a conductive cable and analog to digital circuitry for converting analog signals received from the load cell element to digital signals corresponding to the force exerted on the associated load cell element.

BACKGROUND OF THE INVENTION

Measuring transducers are used to measure force in various applications. For example, transducers are used for measuring physical properties and conditions such as weight, gravity, acceleration, fluid pressure, vibration, and the like.

Measuring transducers which are used to determine the mass or weight of an object are often called load cells. Load cells are used in many different types of weighing systems ranging from extremely accurate balances used by scientists in laboratory settings to large industrial scales capable of measuring hundreds of tons.

Advances in electronics have permitted load cells to be used in combination with analog to digital circuitry for accurately measuring desired physical properties or conditions such as weight, gravity, vibration, acceleration, fluid pressure and the like. When load cells are used in combination with analog to digital circuitry, the measuring device may be considered a digital load cell assembly. Prior art digital load cell assemblies typically include an analog load cell element, a communication cable and a digital display indicator unit which includes a digital display panel, analog to digital circuitry and a power supply.

Prior art digital load cell assemblies comprising a load cell element, a junction box having analog to digital circuitry therein and a digital display indicator including a display panel and a power supply have also been used. Such digital load cell assemblies are troublesome as the analog output of the load cell element is susceptible to interference. Further, the output of the load cell will vary in proportion to the length of the cable associated with the digital load cell assembly.

Another prior art digital load assembly includes relatively large load cells such as platform or canister type load cells which have sufficient room within the associated housing to accommodate a printed circuit board including analog to digital circuitry and a power supply. These type of load cell assemblies are relatively large and cumbersome.

Prior art digital display indicator units which include analog to digital processing circuitry and power supplies are expensive and are difficult to troubleshoot when problems arise due to the relatively complex electronic circuitry arranged therein.

The present invention overcomes the shortcomings associated with prior art digital load assemblies by providing a novel digital load assembly which has advantages in manufacturing, use and testing, and which can be used in measuring applications which do not require analog to digital circuitry arranged within an associated display indicator unit.

SUMMARY AND OBJECTS OF THE INVENTION

The present invention comprises a digital load cell assembly for measuring physical properties or conditions such as weight, gravity, vibration, acceleration, fluid pressure and the like. In a preferred embodiment, the digital load cell assembly of the present invention may be used to measure weight.

The digital load cell assembly of the present invention comprises load cell unit for detecting an applied force and producing analog signals proportional to the applied force. The digital load cell assembly also comprises a cable assembly electrically connected to the load cell unit. The cable assembly includes analog to digital circuitry having at least one input terminal and at least one output terminal, and at least one conductive cable connected between the load cell unit and the at least one input terminal of the analog to digital circuitry for transmitting analog signals received from the load cell unit to the analog to digital circuitry whereby the analog signals are converted to digital signals.

In a preferred embodiment, the digital load cell assembly may also comprise an indicator for displaying a value corresponding to the applied force detected by the load cell unit. The indicator may be a weight display indicator. In alternate embodiments, the indicator may display values corresponding to other measured physical properties or conditions such as gravity, vibration, acceleration, fluid pressure and the like.

The cable assembly of the digital load cell assembly preferably comprises insulation means for insulating the at least one conductive cable and the analog to digital circuitry. To this end, the insulation means may surround the at least one conductive cable and the analog to digital circuitry.

The cable assembly preferably also comprises a printed circuit board arranged within the insulation means. In this preferred embodiment, the analog to digital circuitry may be arranged on the printed circuit board. The cable assembly may also comprise power supply means arranged on the printed circuit board for providing an excitation voltage to the load cell unit.

In a preferred embodiment, the analog to digital circuitry has at least one input terminal and at least one output terminal. In this preferred embodiment, the cable assembly may comprise at least one conductive input cable connected between the load cell unit and the at least one input terminal of the analog to digital circuitry for transmitting analog signals received from the load cell unit to the analog to digital circuitry whereby the analog signals are converted to digital signals. It is also preferable for the cable assembly to comprise at least one conductive output cable connected between the at least one output terminal of the analog to digital circuitry and an associated display indicator whereby digital signals are transmitted from the analog to digital circuitry to the display indicator which displays a value corresponding to the applied force detected by the load cell unit.

The at least one conductive input cable may comprise a first set of cables and the at least one conductive output cable may comprise a second set of cables. In a preferred embodiment, the first set of cables comprises a greater quantity of cables than the second set of cables. For example, the first set of cables may comprise about six cables and the second set of cables may comprise about four cables.

The digital load cell assembly of the present invention has several advantages over prior art load cells. In particular, it does not require external temperature gauges and cables to be used during temperature and load calibration steps. Thus, the present digital load cell assembly is advantageous from a manufacturing standpoint. It is also advantageous from a use and testing standpoint as it substantially eliminates variations in the output signal of the associated load cell element upon modification of the overall cable length.

It is an object of the present invention to provide a digital load cell assembly wherein the analog to digital circuitry and the power supply means are arranged on a printed circuit board within the cable assembly.

It is another object of the present invention to provide a digital load cell assembly that may be used with a display indicator which does not include analog to digital circuitry therein.

These objects, and other objects, features and advantages of the present invention will be more readily understood when read in conjunction with the following detailed description of the present invention and the accompanying drawings.

DETAILED DESCRIPTION OF THE PREFERRED EMBODIMENTS

Figure 1:
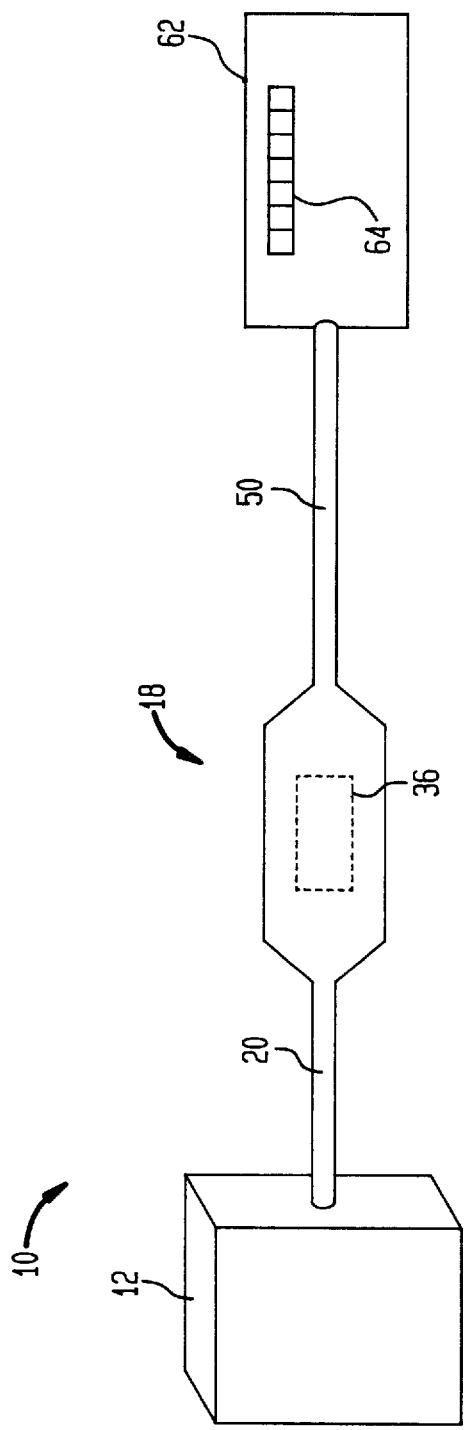
FIG. 1 is a simplified schematic illustration of one embodiment of a digital load cell assembly in accordance with the present invention.

A digital load assembly in accordance with the present invention is denoted by reference numeral 10 in FIG. 1. The digital load cell assembly 10 will be discussed herein with specific reference to a weighing system for determining the weight of an object. However, it should be understood that the digital load cell assembly 10 can be used to measure various physical properties or conditions other than weight such as gravity, vibration, acceleration, fluid pressure and the like.

Figure 2:
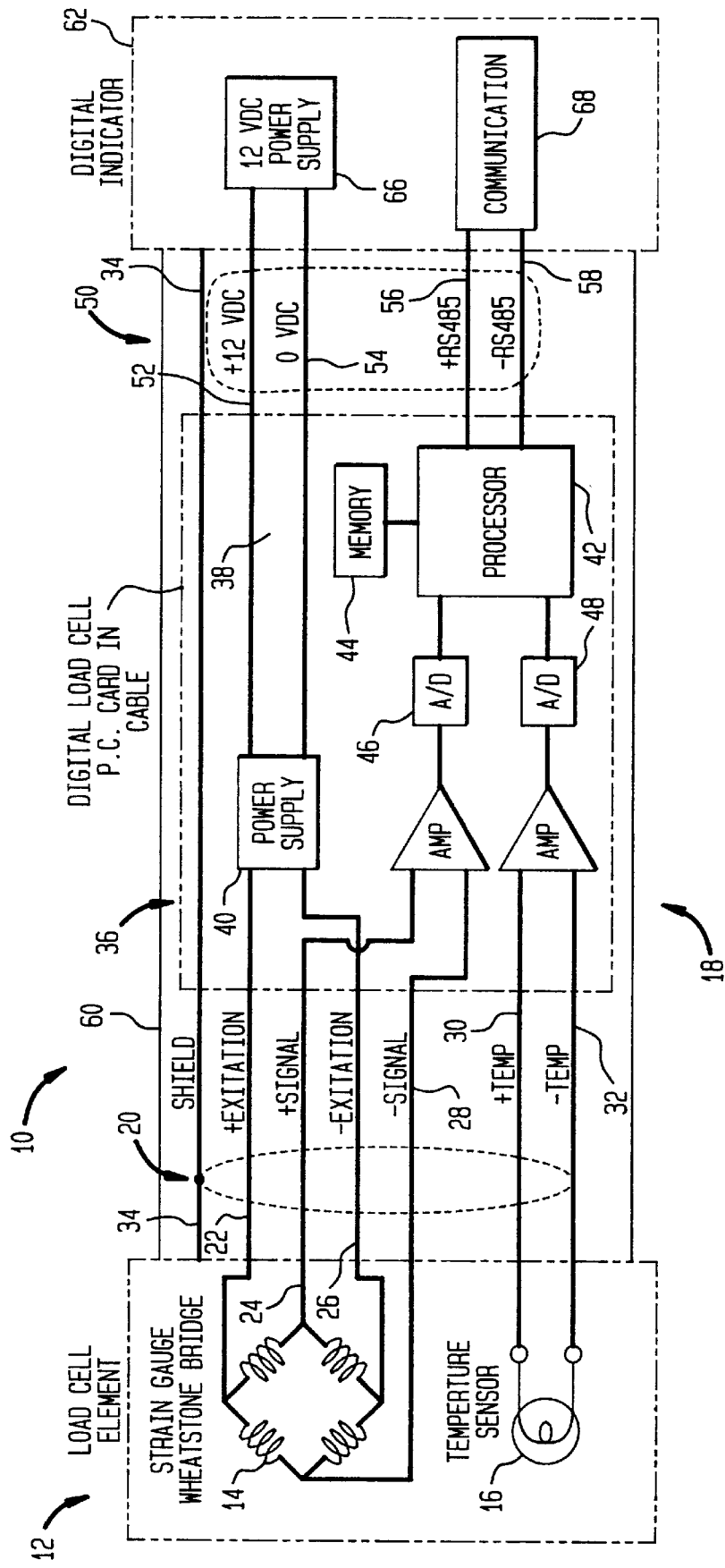
FIG. 2 is a simplified schematic illustration of the circuit components of the digital load cell assembly shown in FIG. 1.

As best shown in FIGS. 1 and 2, the digital load cell assembly 10 includes a load cell unit 12 which may have a housing shaped in accordance with conventional load cell housing configurations. Preferred types of load cell units include those known as the "S" type, single ended beam or platform load cells. Other types of load cells can be used with the present invention including canister type load cells, miniature load cells, and load cells having various other configurations.

As used herein, the term "digital load cell assembly" is intended to include at least the combination of a load cell unit and a cable assembly. The overall digital load cell assembly may also include a digital display indictor.

FIGS. 1 and 2 illustrate that the digital load assembly 10 comprises a load cell unit 12 in combination with a cable assembly 18. The cable assembly 18 comprises a first cable section 20—which may be considered the input section, an intermediate section 36 and a second cable section 50—which may be considered the output section.

A digital display indicator 62 having an LED display 64 is electrically connected to the second cable section 50. The display indicator 62 is unique with respect to prior art display indicators as it does not include a printed circuit board having analog to digital circuitry thereon.

The load cell unit 12 includes a transfer mechanism (not shown) in FIG. 2. The transfer mechanism is well known in the art and may include various mechanical or electronic components for translating the force exerted by an object placed on a scale into a measurable force.

As schematically shown in FIG. 2, the load cell unit 12 includes a load cell element 14 which may comprise a wheatstone bridge adapted to detect the measurable force from the transfer mechanism. A temperature sensor 16, which may comprise one or more thermistors or a BALCO type resistor, is also placed within the housing of the load cell unit 12 for use in calibrating the output of the load cell element 14 as discussed below.

The cable assembly 18 includes a particularly novel structure as analog to digital circuitry is arranged on a printed circuit board within the cable assembly 18. This feature of the present invention will be discussed in detail below. The first cable section 20 is arranged between the load cell unit 12 and the electronic circuitry within the intermediate cable section 36. In the preferred embodiment of the present invention shown in FIG. 2, the first cable section 20 comprises six active conductor cables 22–32. A conductive shield 34 extends along the length of the cable assembly 18 and is used to prevent unwanted electromagnetic signals from interfering with the desired signals transmitted through conductor cables 22–32. The conductive shield 34 is preferably connected to a drain wire (not shown). An external insulator 60 surrounds the conductor cable 22–32 and the shield 34 of the first cable section 20. The insulator 60 also extends along the remainder of the cable assembly 18 to protect and insulate the electronics at the intermediate section 36 and the conductor cables at the second cable section 50.

As shown in simplified form in FIGS. 1 and 2, the intermediate cable section 36 includes a printed circuit board 38 with electronic circuitry thereon for digitizing signals received from the load cell element 12 and processing the digitized signals prior to transmission to the digital display indicator 62. A power supply 40 for regulating a dc voltage signal to the load cell element 14 is also arranged on the printed circuit board 38. Further, a microprocessor 42 and a memory chip 44 is arranged on the printed circuit board 38. Analog to digital circuitry 46 and 48 for converting analog signals received from the load cell element 14 and the temperature sensor 16 respectively are also arranged on the printed circuit board in communication with the microprocessor 42. The arrangement of the analog to digital circuitry and other electronic components within the cable assembly 18 presents an entirely novel concept with respect to prior art digital load cell assemblies.

The second cable section 50 is shown in FIGS. 1 and 2 in electrical communication between the printed circuit board 38 and the digital display indicator 62. The second cable section 50 includes four active conductor cables 52–58 and the conductive shield 34 surrounded by the outer insulator 60. The four active conductor cables 52–58 represent two transmission cables for transmitting power from power supply 66 to the power supply 40 on the printed circuit board 38, and two data transmission cables which transmit data to and from the digital display indicator 62 via RS485 connectors (not shown). Data is preferably transmitted at 19,200 or 38,400 or higher baud. However, data can also be transmitted at lower baud rates if desired.

As shown in FIGS. 1 and 2, the digital display indicator 62 includes an LED display window 64 for displaying a value which corresponds to the force applied to the associated load cell element 14 of the digital load assembly 10. A power supply 66 such as a 12 volt DC power supply may be arranged within the housing of the digital display indicator 62. Communication circuitry 68 which is known in the art may also be arranged within the digital display indicator 62.

In a preferred embodiment, the cable assembly 18 may include approximately twenty one feet of cable. It should be appreciated that the length of the preferred embodiment of the cable assembly 18 is discussed herein for illustrative purposes only and may be greater or less than twenty one feet is alternate embodiments of the present invention. In accordance with the preferred embodiment, the first cable section 20 may be approximately one foot long and extends between the load cell unit 12 and the intermediate section 36 including the printed circuit board 38 and the electronics thereon. The second cable section 50 may be about twenty feet long and extends between the other side of the intermediate section 36 and the digital display indicator 62.

It is desirable for the digital load cell assembly 10 to be waterproof. To this end, the cable assembly 18 and the load cell unit 12 may be potted with a potting compound having a composition known in the art. The printed circuit board 38 may be molded and may therefore constitute an integral part of the cable assembly 18. In an alternate embodiment, the printed circuit board 38 may be separately attached to the individual cable conductors 22–32 and 52–58 of the cable assembly 18.

The communications protocol of the present invention is preferably designed to permit the digital display indicator 62 to work with any number of load cells from 1 to 128. In alternate embodiments, more than 128 load cells may be accommodated by the communications protocol. A weighing device with only one load cell unit 12 can be set up to continuously output data to the digital display indicator 62. A weighing device with multiple load cell units 12 may require that the digital display indicator 62 address all of the load cell units 12 at the same time so that the load cell elements 14 can detect an applied force and produce an analog signal proportional to the applied force at the same moment. Each of the load cell elements 14 will then transmit the analog signals to the analog to digital circuitry 46 in sequence so that the converted digital signals are sequentially transmitted to the digital display indicator 62.

In an embodiment where multiple load cell units are used, each of the load cell units 12 will preferably have a different address. This will permit the communications protocol to selectively and individually address the load cell units 12.

The analog to digital circuitry 46 may comprise a twenty bit analog to digital converter that has the capability of outputting between 0 and 400,000 counts for positive loads and between 0 to –400,000 counts for negative loads. The value of the counts will be proportional to the force exerted on the associated load cell unit 12. For example, when no load is applied, the associated load cell element 12 will output a value of 0 counts. At fifty percent capacity, the associated load cell unit 12 will output 200,000 counts. At capacity, it will output 400,000 counts. In alternate embodiments, different types of analog to digital converters may be used and the range of output counts may vary.

A digital display indicator 62 should have various standard features such as the ability to address each load cell unit 12 individually or all load cell units 12 at once, and the ability to change the address of a load cell unit 12 that is unconnected. The digital display indicator 62 should also be able to perform diagnostics on each load cell unit 12 to determine if the particular load cell unit 12 is not functioning properly. The digital display indicator 62 may apply a scaling factor to the output of each load cell unit 12 separately and may then send the outputs to obtain the total weight of an object placed on an associated weighing device. As indicated above, one difference between digital display indicator 62 and prior art display indicators is that digital display indicator 62 does not require analog to digital circuitry arranged therein to perform analog to digital conversion operations. This is because the analog to digital circuitry of the present load cell assembly 10 is arranged on the printed circuit board 38 within the cable assembly 18.

Figure 3A:
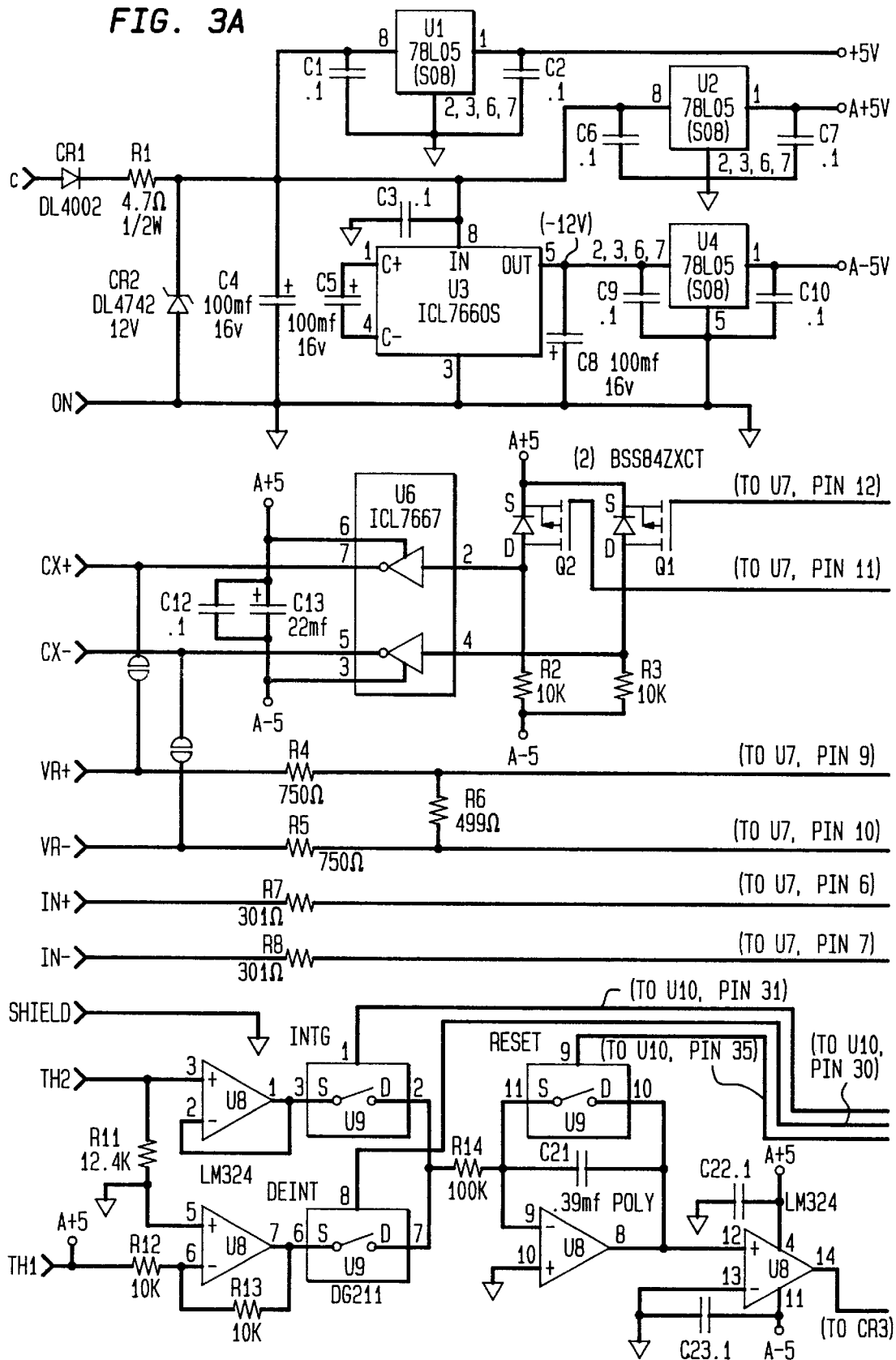
FIG. 3A is a detailed schematic illustration of a first part of the electronics arranged on the printed circuit board within the cable assembly of the present invention.
Figure 3B:
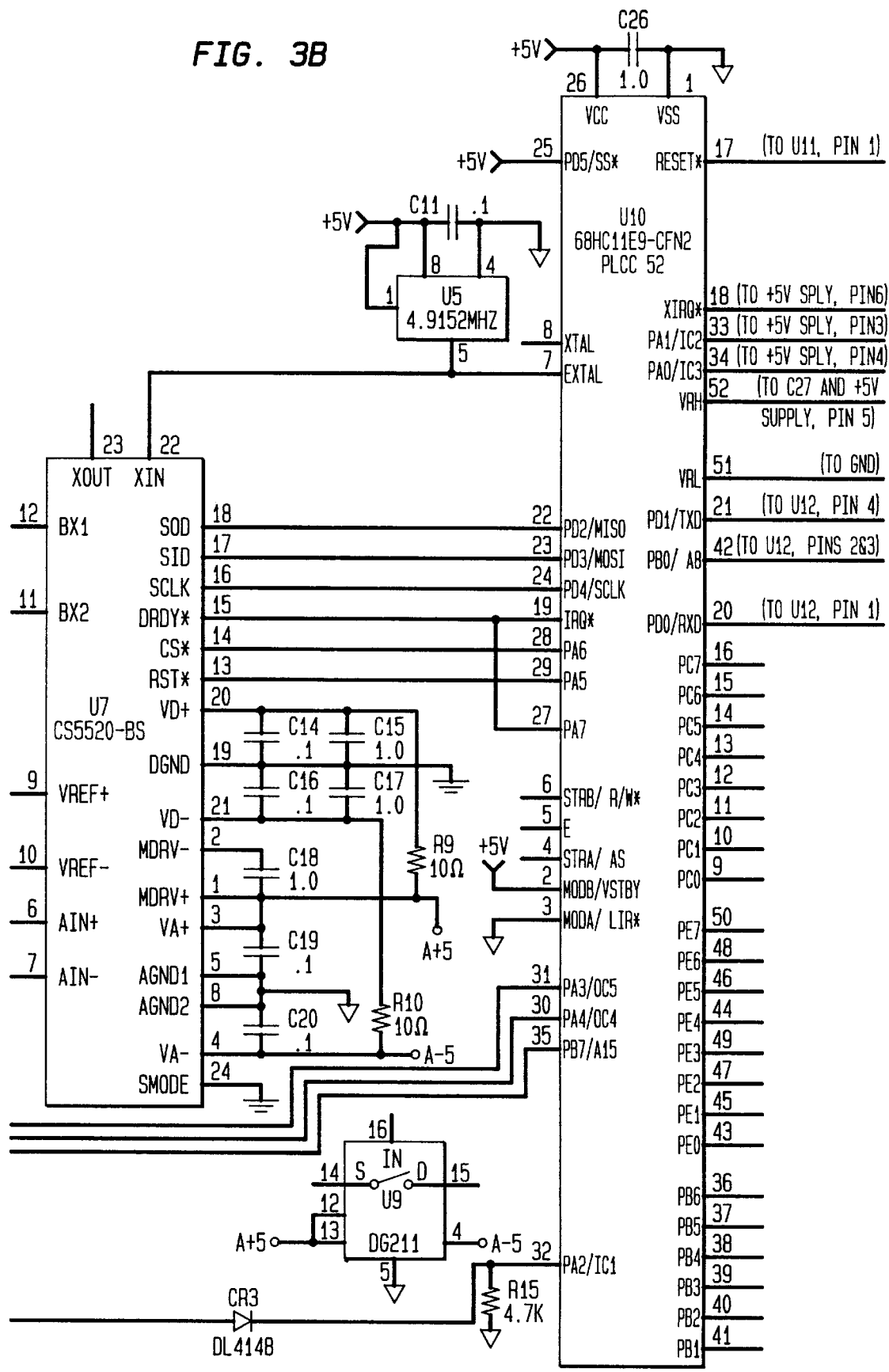
FIG. 3B is a detailed schematic illustration of a second part of the electronics arranged on the printed circuit board within the cable assembly of the present invention.
Figure 3C:
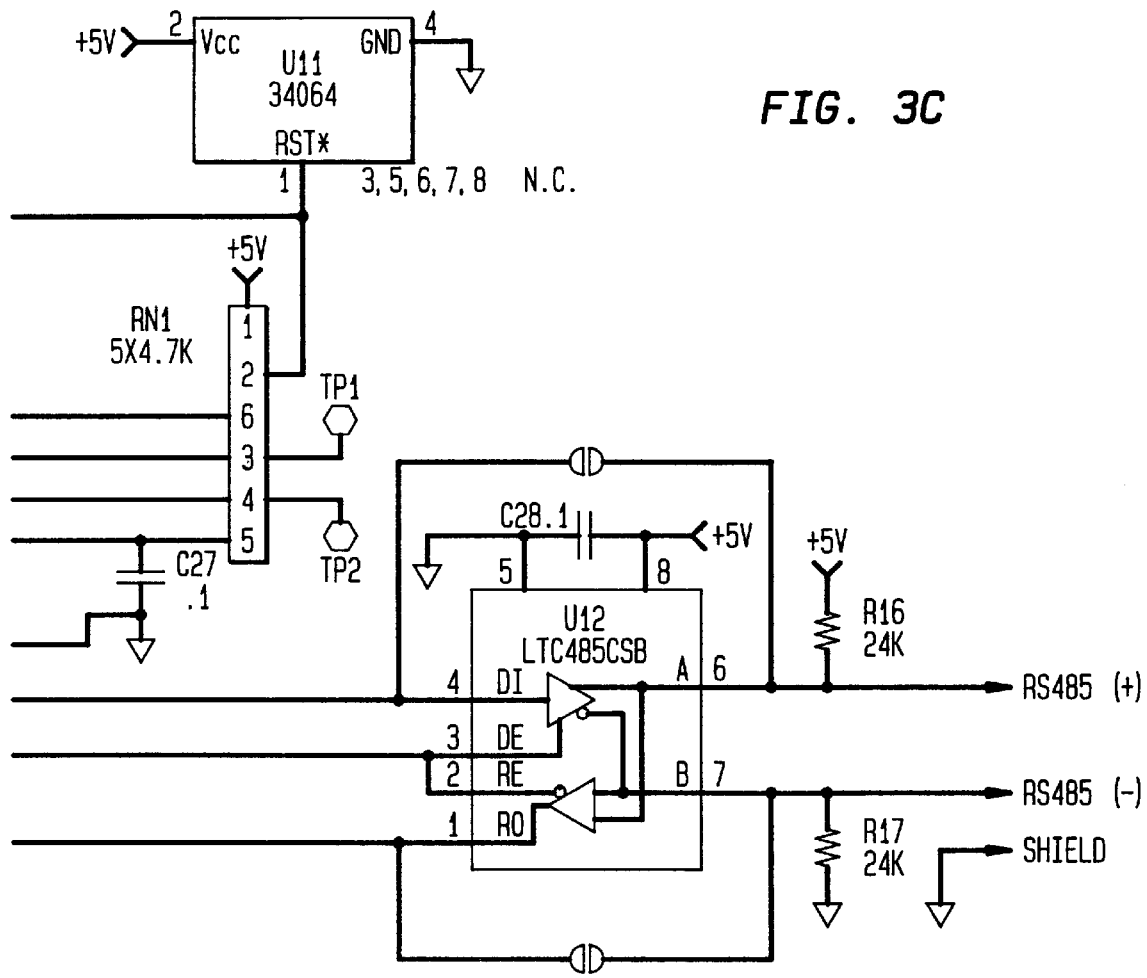
FIG. 3C is a detailed schematic illustration of a third part of the electronics arranged on the printed circuit board within the cable assembly of the present invention.
Figure 3:
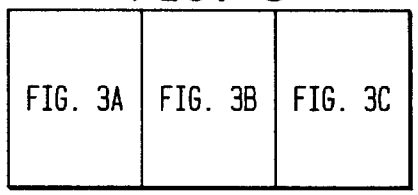
FIG. 3 is a block diagram showing the relationship between schematic illustrations 3A–3C.
Figure 4:
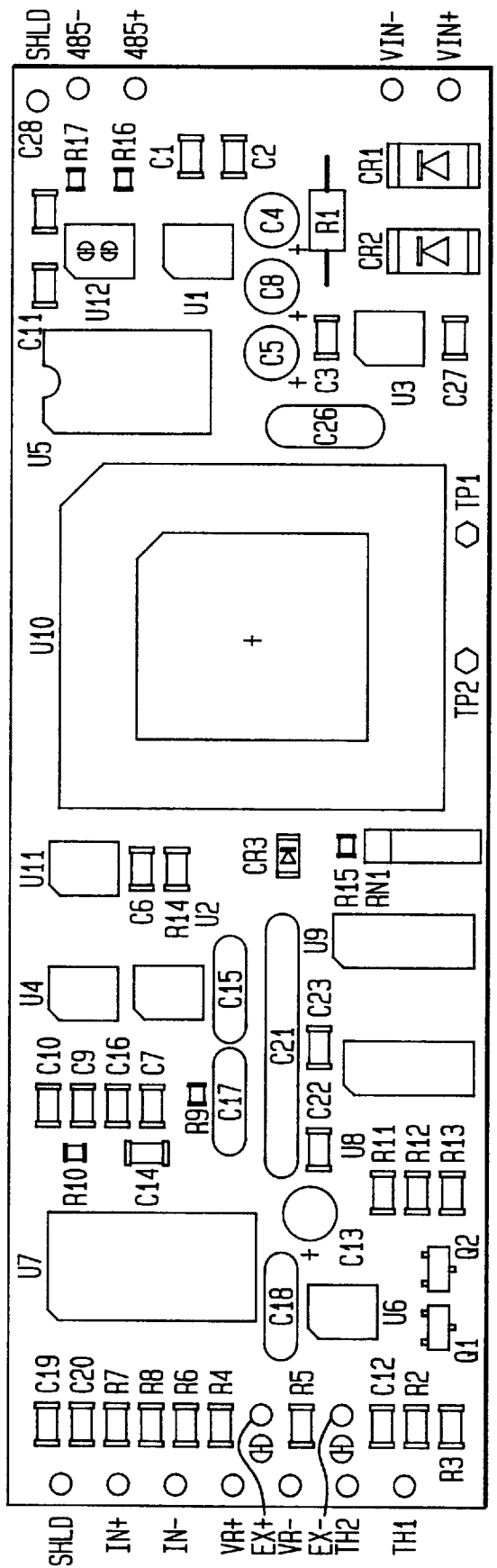
FIG. 4 is an isolated top plan enlarged view of the printed circuit board including the electronic components which correspond to the electrical schematic shown in FIGS. 3A, 3B and 3C.

Detailed circuit schematic illustrations of the electronic circuitry arranged on the printed circuit board 38 is illustrated in FIGS. 3A–3C. The relationship between FIGS. 3A, 3B and 3C is shown in block format by the legend of FIG. 3. Further, the physical layout of the circuit components on the printed circuit board 38 is shown in FIG. 4. It should be appreciated that the specific electronic circuitry of FIGS. 3A–3C and the circuit components shown in FIG. 4 may be modified in alternate embodiments while remaining within the scope of the present invention. To this end, various equivalent circuit components and arrangements may be selected while still providing analog to digital circuitry within a cable assembly for use in connection with a load cell unit.

As shown in FIGS. 2, 3A–3C, the 12 volt DC power supply 66 of the digital display indicator 62 utilizes conductor cables 52 and 54 to provide power to the electronic circuitry arranged on the printed circuit board 38 and to provide an excitation voltage at opposite sides of the wheatstone bridge load cell element 14. To this end, the 12 volt DC signal is preferably regulated by power supply 40 which then transmits the power signal at plus or minus 5 volts along conductor cables 22 and 26 to opposing sides of the wheatstone bridge load cell element 14.

Conductor cables 24 and 28 are connected to the two remaining terminals of the load cell element 14 and receive the positive and negative analog output signals corresponding to the force exerted on the load cell element 14. These output signals are then transmitted into the analog to digital circuitry 46 where they are converted into digital signals to be processed by microprocessor 42. The processed digital output signals are then transmitted to communication circuitry 66 via conductor cables 56 and 58 and RS485 connectors (not shown).

Temperature calibration should be performed on the load cell units 12 by the load cell manufacturer. The structure and operation of the digital load cell assembly 10 permits temperature calibration to be performed in a manner which is much simpler than prior art load cell assemblies. This is due to the existence of temperature sensors 16 in load cell element 12 in combination with the microprocessor 42. Such temperature calibration can therefore be accomplished without the use of temperature gauges which are required in prior art load cell assemblies.

When performing temperature calibration a desired quantity of digital load cell assemblies 10 should be placed in a suitable environmental chamber. To this end, each digital load cell assembly 10 should include a load cell unit 12 and a cable assembly 18. All of the load cell assemblies 10 should then be wired in parallel to a communications port of a video terminal so that load data obtained by the load cell assemblies can be written into memory on memory chip 44. All of the load assemblies 10 are then unloaded—arranged so that no load is placed thereon. The temperature within the environmental chamber is then adjusted to about −10° C. and the load cell assemblies 10 are allowed to soak. The load assemblies 10 remain in this state until steady state is reached. The load data and the temperature data is then written to the associated memory chip 44 with the first temperature calibrate command. The temperature within the environmental chamber is then raised to 20° degrees C. (about room temperature) and the digital load assemblies 10 are again permitted to soak. When steady state is reached, the load data and the temperature data is again written into memory on memory chip 44 with the second temperature calibrate command. At this time, the temperature in the environmental chamber is raised to about 40° C. and the digital load cell assemblies 10 are again allowed to soak. Once steady state is reached, the load data and the temperature data is written to memory on memory chip 44 with the third calibrate temperature command.

The aforementioned temperature calibration is appreciably easier than temperature calibration of prior art load cell assemblies such as standard strain gauges which require temporary cables to be soldered into assembled position and later removed when final cables are soldered into position. Further, prior art load cell assemblies require trial and error temperature testing to be performed in order to determine the correct value of the temperature compensation resistors. Such trial and error testing is not required when performing temperature calibration of the present load cell assembly 10. Moreover, prior art load cell assemblies require resistors for span, modulus and zero to be selected and checked for accuracy during temperature calibration. Since the present digital load cell assemblies 10 do not require these resistors, the production costs will be lowered.

As shown in simplified form in FIG. 2, analog output data from temperature sensor 16 may be transmitted along conductor cables 30 and 32 into analog to digital circuitry 48 and through microprocessor 42 prior to transmission in conjunction with the digitized signals from the load cell elements 14 for display in LED display window 64 of digital display indicator 62.

Figure 5:
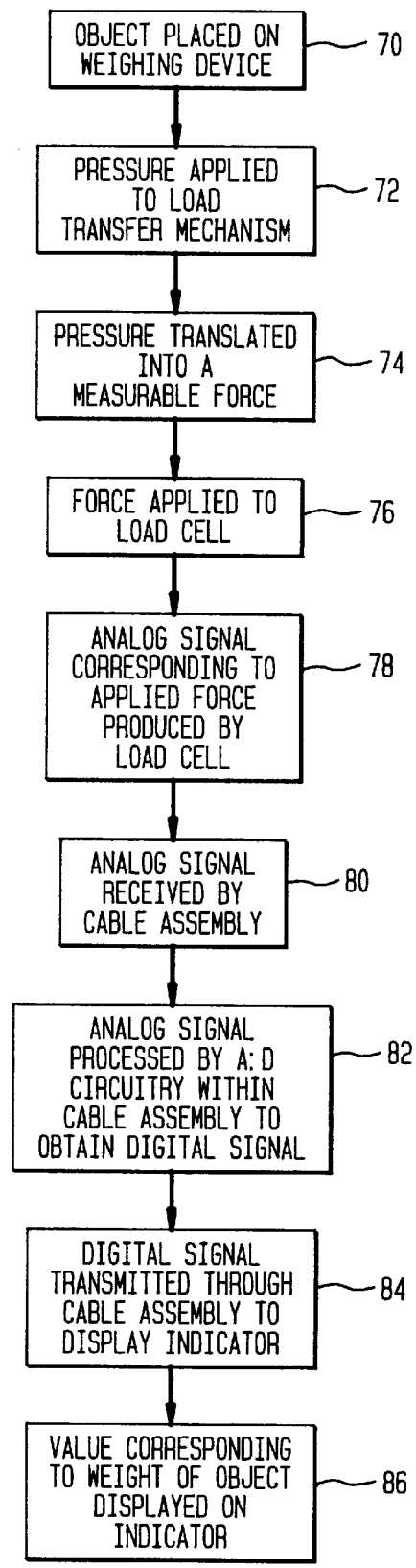
FIG. 5 is a flow chart of the operating steps of the present digital load cell assembly.

The flow chart of FIG. 5 depicts the general operating steps when weighing an object on a device utilizing one or more of the digital load cell assemblies 10. Initially, an object is placed on a weighing device (not shown in FIGS. 1 and 2) as indicated at step 70. Placement of the object on the associated weighting device will cause a force to be applied to a load transfer mechanism (also not shown) associated with a load cell unit 12 at step 72. The force is then translated by the transfer mechanism at step 74 into a measurable force and the force is applied to an associated load cell element 14 as indicated at step 76.

An analog signal corresponding to the applied force is then generated by the excited load cell element 14 at step 78 and the analog output signal is received by conductor cables 24 and 28 of the first cable section 20 as indicated at step 80.

The analog signal is then processed at step 82 by the analog to digital circuitry 46 arranged on printed circuit board 38 within the intermediate section 36 of the cable assembly 18 whereby a digital signal is obtained. As indicated at step 84, the digital signal is then processed by microprocessor 42 and is transmitted through conductor cables 56 and 58 of the second cable section 50 to communication circuitry 68 of the digital display indicator 62. Finally, step 86 illustrates that the value corresponding to the weight of the object placed upon the weighing device is displayed in LED display window 64.

Communication between the electronics on printed circuit board 38 and the communications electronics 68 of digital display indicator 62 may be via RS485 connectors at 19,200 or higher baud with one start bit, 7 data bits, no parity bit and two stop bits for a total of 10 bits per byte. When power is supplied, the microprocessor 42 will preferably receive data at a rate of 60 to 100 times per second. This data will be created for linearity and temperature and will be saved as temporary data. The number of samples may be set using the set sample command. If the number of samples is twenty, the microprocessor 42 will output the average of the last twenty readings. As a new reading is saved in temporary data, the oldest reading may be discarded. This will permit the number of readings and temporary data to remain at twenty. A small sample size will give a fast response but may have increased instability. A large sample size may give a more stable output but will take longer to reach steady state.

While the foregoing description and figures are directed toward the preferred embodiments of the present invention, it should be appreciated that numerous modifications can be made to various structural features of the present invention. Indeed, such modifications are encouraged to be made to the present digital load cell assembly without departing from the spirit and scope of the invention. Thus, the foregoing description of the preferred embodiments should be taken by way of illustration rather than by way of limitation as the present invention is defined by the claims set forth below.

I claim:

1. A digital load cell assembly comprising: a load cell unit for detecting an applied force and producing analog signals proportional to said applied force; a cable assembly electrically connected to said load cell unit, said cable assembly including analog to digital circuitry having at least one input terminal and at least one output terminal, and a first set of conductive cables connected between said load cell unit and said at least one input terminal of said analog to digital circuitry for facilitating calibration of said load cell unit and for transmitting said analog signals received from said load cell unit to said analog to digital circuitry whereby said analog signals are converted to digital signals, said cable assembly further including a second set of cables connected to said at least one output terminal of said analog to digital circuitry for transmitting said digital signals to an associated indicator which displays a value corresponding to the applied force detected by said load cell unit.

2. The digital load cell assembly of claim 1 wherein said cable assembly further comprises insulation means for insulating said at least one conductive cable and said analog to digital circuitry, said insulation means surrounding said at least one conductive cable and said analog to digital circuitry.

3. The digital load cell assembly of claim 2 wherein said cable assembly further comprises a printed circuit board arranged within said insulation means, said analog to digital circuitry being arranged on said printed circuit board.

4. The digital load cell assembly of claim 3 wherein said cable assembly further comprises power supply means arranged on said printed circuit board for providing an excitation voltage to said load cell means.

5. A digital load cell assembly comprising: load cell unit for detecting an applied force and producing analog signals proportional to said applied force; a cable assembly electrically connected to said load cell unit, said cable assembly including analog to digital circuitry having at least one input terminal and at least one output terminal, and a first set of conductive input cables connected between said load cell unit and said at least one input terminal of said analog to digital circuitry for facilitating calibration of said load cell unit and for transmitting said analog signals received from said load cell unit to said analog to digital circuitry whereby said analog signals are converted to digital signals, and a second set of conductive output cables connected to said at least one output terminal of said analog to digital circuitry; and an indicator for displaying a value corresponding to said applied force detected by said load cell unit, said second set of conductive output cables being connected between said at least one output terminal of said analog to digital circuitry and said indicator whereby said digital signals are transmitted from said analog to digital circuitry to said indicator.

6. The digital load cell assembly of claim 5 wherein said cable assembly further comprises insulating means for insulating said conductive input and output cables and said analog to digital circuitry, said insulating means surrounding said conductive input and output cables and said analog to digital circuitry.

7. The digital load cell assembly of claim 6 wherein said cable assembly further comprises a printed circuit board arranged within said insulating means, said analog to digital circuitry being arranged on said printed circuit board.

8. The digital load cell assembly of claim 7 wherein said cable assembly further comprises power supply means arranged on said printed circuit board for providing an excitation voltage to said load cell means.

9. The digital load cell assembly of claim 5 wherein said first set of cables comprises a greater quantity of cables than said second set of cables.

10. The digital load cell assembly of claim 9 wherein said first set of cables comprises about six cables and said second set of cables comprises about four cables.

11. The digital load cell assembly of claim 5 wherein said indicator comprises a weight display indicator.

12. The digital load cell assembly of claim 5 wherein said load cell unit includes strain gauge circuitry arranged thereon.

13. The digital load cell of claim 12 wherein said strain gauge circuitry comprises a wheatstone bridge circuit.

14. The digital load cell of claim 12 wherein said load cell unit further includes a temperature sensor arranged thereon, said strain gauge circuitry and said temperature sensor being electrically connected to said first set of conductor cables so that analog signals received from said strain gauge circuitry and said temperature sensor are transmitted to said analog to digital circuitry.

15. The digital load cell assembly of claim 1 wherein said load cell unit includes strain gauge circuitry arranged thereon.

16. The digital load cell of claim 15 wherein said strain gauge circuitry comprises a wheatstone bridge circuit.

17. The digital load cell of claim 15 wherein said load cell unit further includes a temperature sensor arranged thereon, said strain gauge circuitry and said temperature sensor being electrically connected to said first set of conductor cables so that analog signals received from said strain gauge circuitry and said temperature sensor are transmitted to said analog to digital circuitry.

* * * * *